(12) United States Patent
Weinholdt et al.

(10) Patent No.: US 10,252,479 B2
(45) Date of Patent: Apr. 9, 2019

(54) RESIN BARRIER DEVICE FOR AN INFUSION TOOL

(71) Applicant: Airbus Operations GmbH, Hamburg (DE)

(72) Inventors: Michael Weinholdt, Hamburg (DE); Lionel Winkelmann, Hamburg (DE); Guillaume Grieve, Vendeuvre (FR); Alexander Wulfers, Nieuwegein (NL); Nadine Magura, Aachen (DE)

(73) Assignee: Airbus Operations GmbH, Hamburg (DE)

( * ) Notice: Subject to any disclaimer, the term of this patent is extended or adjusted under 35 U.S.C. 154(b) by 100 days.

(21) Appl. No.: 15/359,481

(22) Filed: Nov. 22, 2016

(65) Prior Publication Data
US 2017/0151732 A1 Jun. 1, 2017

(30) Foreign Application Priority Data
Nov. 26, 2015 (DE) .................. 10 2015 120 572

(51) Int. Cl.
*B29C 70/54* (2006.01)
*B29C 70/48* (2006.01)

(52) U.S. Cl.
CPC .............. *B29C 70/48* (2013.01); *B29C 70/54* (2013.01); *B29C 70/548* (2013.01)

(58) Field of Classification Search
CPC .............................. B29C 70/54; B29C 70/548
See application file for complete search history.

(56) References Cited

U.S. PATENT DOCUMENTS

| 4,942,013 A * | 7/1990 | Palmer | B29C 70/548 156/285 |
| 5,441,692 A * | 8/1995 | Taricco | B29C 70/48 264/257 |
| 5,665,301 A * | 9/1997 | Alanko | B29C 70/548 264/257 |

(Continued)

FOREIGN PATENT DOCUMENTS

| AT | 511 113 | 9/2012 |
| CA | 2763116 A1 * | 12/2010 ............. B29C 70/54 |

(Continued)

OTHER PUBLICATIONS

Partial machine translation of DE102006018402A1 dated Oct. 2007 obtained from the espace website. (Year: 2007).*

(Continued)

*Primary Examiner* — Robert B Davis
(74) *Attorney, Agent, or Firm* — Nixon & Vanderhye P.C.

(57) ABSTRACT

A resin barrier device (5) for an infusion tool (1) includes a tubular intermediate piece (15) having a first end (17), which is adapted for connection to a venting outlet (3) of an infusion tool (1), having an opposite second end (19) adapted to be connected to a ventilation line (7), and having a channel (27) surrounded by a pipe wall (25), which forms a fluid connection between the first end (17) and the second end (19), and a semi-permeable barrier wall (29) provided in the channel (27), which is arranged to let an airflow pass from said first end (17) to said second end (19) and to block a resin flow from the first end (19) to the second end (19).

20 Claims, 2 Drawing Sheets

(56) References Cited

U.S. PATENT DOCUMENTS

| | | | | |
|---|---|---|---|---|
| 6,818,159 | B2* | 11/2004 | Hinz | B29C 70/443 264/102 |
| 7,842,209 | B2* | 11/2010 | Wilenski | B29C 70/44 264/102 |
| 8,043,453 | B2* | 10/2011 | Sawicki | B29C 73/12 156/285 |
| 2004/0219244 | A1 | 11/2004 | Filsinger | |
| 2008/0136060 | A1* | 6/2008 | Shpik | B29C 70/548 264/319 |
| 2010/0139839 | A1 | 6/2010 | Ridgard | |

FOREIGN PATENT DOCUMENTS

| | | | |
|---|---|---|---|
| DE | 198 44 366 | 4/1999 | |
| DE | 100 13 409 | 11/2000 | |
| DE | 102006018402 A1 * | 10/2007 | B29C 70/48 |
| DE | 10 2012 219 226 | 4/2014 | |
| DE | 10 2013 002 551 | 8/2014 | |
| EP | 2 644 364 | 10/2013 | |
| EP | 2 650 110 | 10/2013 | |
| EP | 2 871 046 | 5/2015 | |
| JP | 2004-181627 | 7/2004 | |

OTHER PUBLICATIONS

German Search Report cited in GB 10 2015 120 572.6 dated Jun. 22, 2016, seven pages.
Communication cited in EP 16 198 890.2 dated May 14, 2018, 5 pages.
Partial Search Report cited in EP 16 198 890.2 dated May 12, 2017, 19 pages.
Extended Search Report cited in EP 16 198 890.2 dated Aug. 16, 2017, 15 pages.
"Vacuum Traps and Filters", Adsorption Traps, Single-Stage Vacuum Traps, Multi-Stage Vacuum Traps, Oil Mist Eliminators, Jan. 27, 2010, 13 pages.

* cited by examiner

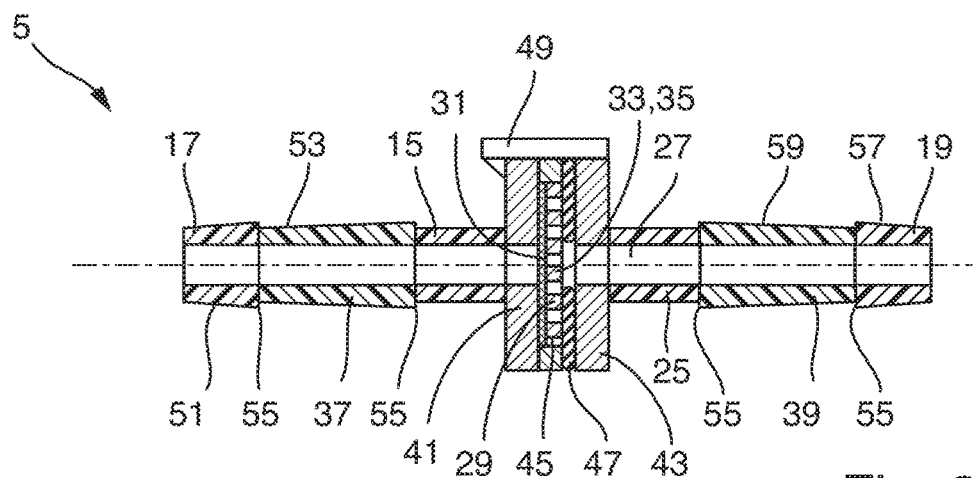
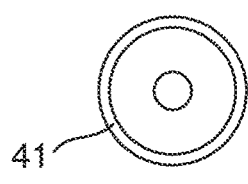
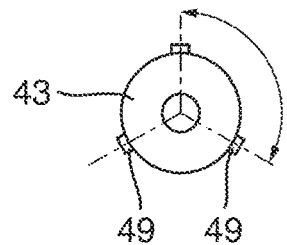
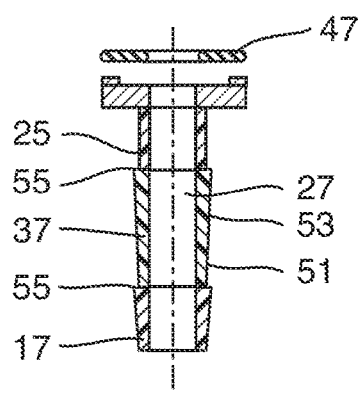
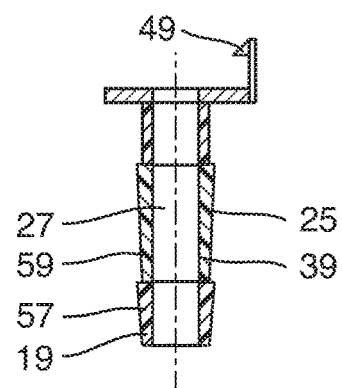

RESIN BARRIER DEVICE FOR AN INFUSION TOOL

RELATED APPLICATION

This application claims priority to German Patent Application No. 10 2015 120 572.6 filed Nov. 26, 2015, the entirety of which is incorporated by reference.

BACKGROUND OF THE INVENTION

The present invention relates to a resin barrier device for an infusion tool. A further aspect of the present invention relates to such an infusion tool, which has a venting outlet and a ventilation line connected to the venting outlet.

Infusion tools are usually used for producing fiber composite components by means of infusion methods. In doing so, various infusion methods can be used, all of which have in common that resin is moved through a preform of dry fibers, provided in or on the infusion tool, due to a pressure difference between a resin inlet and a venting outlet of the infusion tool, until the preform is completely resin-impregnated and may be hardened. For the purposes of the present invention, the term infusion method includes both processes in which resin is sucked by a vacuum at the venting outlet from the resin inlet through the preform, as well as processes in which resin is pressed out of the resin inlet and through the preform by an overpressure, wherein the displaced air can escape through the venting outlet, as well as mixed method, in which both aforementioned method variants are combined. That is, within the meaning of the present invention, the term infusion method also includes injection methods, and the term infusion tool also includes injection tools.

In the so-called resin transfer molding (RTM) process, a preform is impregnated with a resin and hardened in a closed infusion tool. In doing so, the preform is first introduced into a hermetically sealed cavity formed between a first and a second tool part. Then, a vacuum is produced at a venting outlet connected to a vacuum device via a ventilation line. As a result, resin is sucked from a resin inlet connected to a resin source through the cavity and thus through the preform to the venting outlet until the cavity is completely filled with resin and the preform is therefore completely resin-impregnated. Alternatively or simultaneously, the resin can also be injected from the resin inlet into the cavity using an overpressure. Subsequently, hardening of the resin-impregnated preform under the influence of temperature and pressure can start.

So-called resin infusion (RI) methods differ from RTM methods primarily in that the infusion tool is not a closed tool having a hermetically sealed cavity provided between two tool parts, but is an open tool having usually only one tool part, on the surface of which the preform made of dry fibers is deposited. In order to produce a hermetically sealed atmosphere around the preform anyhow, at least the surface of the preform facing away from the tool is covered by a vacuum film, preferably the entire tool including the preform, is packaged in a vacuum bag. Subsequently, similar to the RTM method, a vacuum is produced at a venting outlet in the infusion tool, and resin from a resin inlet is consequently sucked through the preform.

As an alternative to producing a negative pressure at the venting outlet, for the infusion methods described above, it is also possible to force the resin through the preform using an overpressure at the resin inlet while the air is forced through the resin and out at the venting outlet. In either case, the resin is moved through the preform due to a pressure differential between the venting outlet and the resin inlet.

SUMMARY OF INVENTION

The problem inherent in these methods is watching for the correct moment when the preform is completely saturated with resin and the vacuum, i.e., the vacuum device, has to be switched off. If the negative pressure is switched off too soon, air inclusions remain in the preform or the component to be produced, which can weaken the structure of the component. If the negative pressure is switched off too late, resin passes through the venting outlet into the ventilation line, resulting in the latter being soiled by resin and possibly even destroyed, which in turn results in cleaning work and costs. For this reason, it is currently necessary and customary to closely monitor the progress of the resin in order to shut down the negative pressure as soon as the resin reaches the venting outlet. This, however, requires an expensive sensor system or a technician on-site to monitor the progress of the resin, which in turn requires effort and expense.

For this reason, the present invention may be embodied to provide an infusion tool, wherein the resin infusion does not require laborious monitoring. Specifically, the invention may be embodied as a resin barrier device for an infusion tool or by an infusion tool having such a resin barrier device.

The resin barrier device may comprise a tubular intermediate piece and a semi-permeable barrier wall. The tubular intermediate piece has a first end and an opposing second end. The first end is adapted for connection to a venting outlet, for example a vacuum port, of an infusion tool. The second end is adapted for connection to a ventilation line, for example, a hose, which can be connected, for example, to a vacuum device. Furthermore, the tubular intermediate piece has a channel surrounded by a pipe wall, forming a fluid connection between the first and the second end. The semi-permeable barrier wall is disposed within the channel and arranged to let an airflow pass from the first end towards the second end and to block a resin flow from the first end towards the second end.

Such a resin barrier device can be used to let the air escape unhindered through the barrier, while the resin is stopped by the barrier wall. Thus, without having to monitor the resin infusion process, it can be ensured that no resin enters the ventilation line via the venting outlet. Simultaneously, air inclusions in the component can be prevented, as the vacuum can remain present until the resin reaches the barrier wall. As the resin cannot penetrate beyond the barrier wall, the time of the shutdown of the negative pressure is not critical, i.e. the infusion process does not need to be closely monitored.

In a one embodiment, the barrier wall has a semi-permeable membrane arranged to let an airflow pass from the first end to the second end and to block a resin flow from the first end to the second end. Such a semi-permeable membrane is a particularly simple means for allowing an airflow to pass through and simultaneously blocking a resin flow. The membrane in this case is preferably a microporous membrane, for example a vacuum assisted process (VAP®) membrane.

In this case, it is particularly preferred if the barrier wall also has a permeable support structure which supports the membrane towards the second end against the pressure of the resin. The support structure is preferably fully permeable to fluids. Such a support structure prevents the resin from pushing the thin-walled membrane from its position or even destroying it.

In this way, it is particularly preferred if the support structure is formed like a lattice, which is disposed on the side of the membrane facing the second end and preferably rests against the membrane. Such a lattice is a particularly simple support structure, which can effectively support the membrane and simultaneously is permeable to the airflow.

In another embodiment, the tubular intermediate piece has a first pipe part and a second pipe part. Here, the first pipe part has the first end and the second pipe part has the second end. The first and second pipe parts are connected to each other in a detachable manner. The barrier wall is preferably disposed between the first and second pipe parts. In this way, the barrier wall can be removed and replaced by detaching the connection of the first and second pipe parts, if the former is soiled by resin. This makes for a particularly fast and easy cleaning of the resin barrier device.

In this case, it is particularly preferred if the first pipe part has a circumferential first flange section opposite the first end and if the second pipe part has a circumferential second flange section opposite the second end. In this case, the first flange section is preferably connected to the second flange section in a detachable manner and preferably rests thereon. In particular, the barrier wall is disposed and fixed between the first flange section and the second flange section. The barrier wall can be easily fastened or held between such opposing flange sections, which are releasably connected to one another, rendering it fixed in the channel at a fixed location. Simultaneously, the barrier wall can be easily removed and replaced by loosening the connection between the first and second flange sections.

In this case, it is also particularly preferred if a gap is provided between the first and the second flange section, where the channel has a larger diameter than further away from the gap. The radial rim of the barrier wall is preferably at least partially disposed in the gap, where it is held in position by the first and second flange sections and unable to slip in the channel.

Simultaneously or alternatively, it is preferred if the barrier wall is clamped between the first and second flange sections. In this way, the barrier wall is fixed in place between the two flange sections and cannot slip in the channel.

In a further embodiment, a sealing ring is provided between the barrier wall and the first flange section and/or the second flange section. In this way, the leaking of fluid between the first and second flange sections can be prevented so that the resin barrier device is hermetically sealed and air can only flow along the channel.

In another embodiment, the first flange section and the second flange section are connected to each another by a snap connection. In this case, either the first or second flange sections, preferably the second flange section, has a snap arm, which engages with the other of the first and second flange sections, preferably with the first flange section. Such a snap connection constitutes a particularly simple and easily detachable connection between the first and second flange sections.

In a further embodiment, the first pipe part has a first port section opposite the first flange section. The first port section is preferably provided to be inserted into the venting outlet. In this case, the outer surface of the first port section is preferably designed conically and has barbs. Simultaneously or alternatively, it is preferred if the second pipe part has a second port section opposite the second flange section. The second port section is preferably provided to be inserted into the ventilation line. The outer surface of the second connecting section is preferably designed conically and has barbs. With a first or second port section shaped in this way, a particularly fast and simple connection to the venting outlet or to the ventilation line can be executed, wherein the first port section or the second port section may be simply plugged into the pipe or the hose of the venting outlet or the ventilation line and anchored there. The first and/or second port section or the entire resin barrier device is preferably made of a plastic material, making the barbs yield slightly during insertion.

A further aspect of an embodiment(s) of the present invention relates to an infusion tool having a venting outlet and a ventilation line connected to the venting outlet. The ventilation line in this case is connected to the venting outlet preferably via a resin barrier device according to one of the previously described exemplary embodiments. The first end of the tubular intermediate piece is preferably connected to the venting outlet and the second end of the tubular intermediate piece is connected to the ventilation line. In this way, an airflow can flow from the venting outlet through the resin barrier device into the ventilation line, for example, when a vacuum is created in the ventilation line by a vacuum device connected to the ventilation line. Simultaneously, the resin flowing out of the venting outlet can be effectively blocked by the barrier wall, preventing it from entering the ventilation line.

According to an embodiment, the first end is connected to the venting outlet via an adapter piece. Simultaneously or alternatively, it is preferred if the second end is connected to the ventilation line via an adapter piece. Such an adapter piece can be used to connect the resin barrier device, for example, to standard connections of the ventilation line or of the venting outlet.

According to a further embodiment, the infusion tool comprises a first tool part and a second tool part. Here, the first tool part and the second tool part preferably enclose a cavity, the shape of which preferably corresponds to that of a component to be produced. The venting outlet is preferably provided in the first and/or in the second tool part and is preferably connected to the cavity via a venting channel.

Such a closed tool can, for example, be used to conduct an RTM process, wherein the ventilation line is connected to a vacuum device, which generates a vacuum or a negative pressure in the ventilation line and thus, via the venting channel, also in the cavity, allowing resin to be sucked from a resin inlet through the cavity and thus through a preform of dry fibers disposed in the cavity until the latter is completely resin-impregnated. In doing so, all the air in the cavity is sucked by the vacuum device through the venting channel and the ventilation line until the resin reaches the barrier wall of the resin barrier device interposed between the venting outlet and the ventilation line.

In this way, resin cannot enter the ventilation line and contaminate it. Simultaneously, all the air can be removed from the cavity, preventing air inclusions from forming. Alternatively to sucking in the resin, the resin can also be pressed through a resin inlet into the cavity by an overpressure, pressing all the air through the resin out of the venting outlet, until the resin reaches the barrier wall.

In an alternative embodiment, the infusion tool comprises only a first tool part having a shaping surface, which corresponds to the shape of a component to be produced, at least on one side of the component. The venting outlet is preferably provided in the first tool part and is preferably connected to the shaping surface via a venting channel.

Such an infusion tool can be used, for example, to conduct an RI method, the first tool part being packaged together with a preform of dry fibers arranged thereon under a vacuum film, preferably in a vacuum bag. Subsequently, by means of a vacuum device connected to the ventilation line, resin is sucked through a resin inlet provided in the first tool part through the preform covered with the vacuum film until the preform is completely resin-impregnated and the resin reaches the barrier wall of the resin barrier device interposed between the venting outlet and the ventilation line. In this way, the contamination of the ventilation line by resin as well as air inclusions in the component are prevented. The component can subsequently be hardened, for example, in an autoclave under the influence of pressure and temperature.

SUMMARY OF THE DRAWINGS

Two exemplary embodiments of the present invention are explained in more detail below with reference to a drawing. In the drawings FIG. 2 shows a cross-sectional view along the channel of a second exemplary embodiment of the resin barrier device according to the invention, FIG. 3 shows a plan view and a sectional view of the first pipe part of the resin barrier device of FIG. 2 and FIG. 4 shows a plan view and a sectional view of the second pipe part of the resin barrier device of FIG. 2.

DETAILED DESCRIPTION OF THE INVENTION

Figure 1:
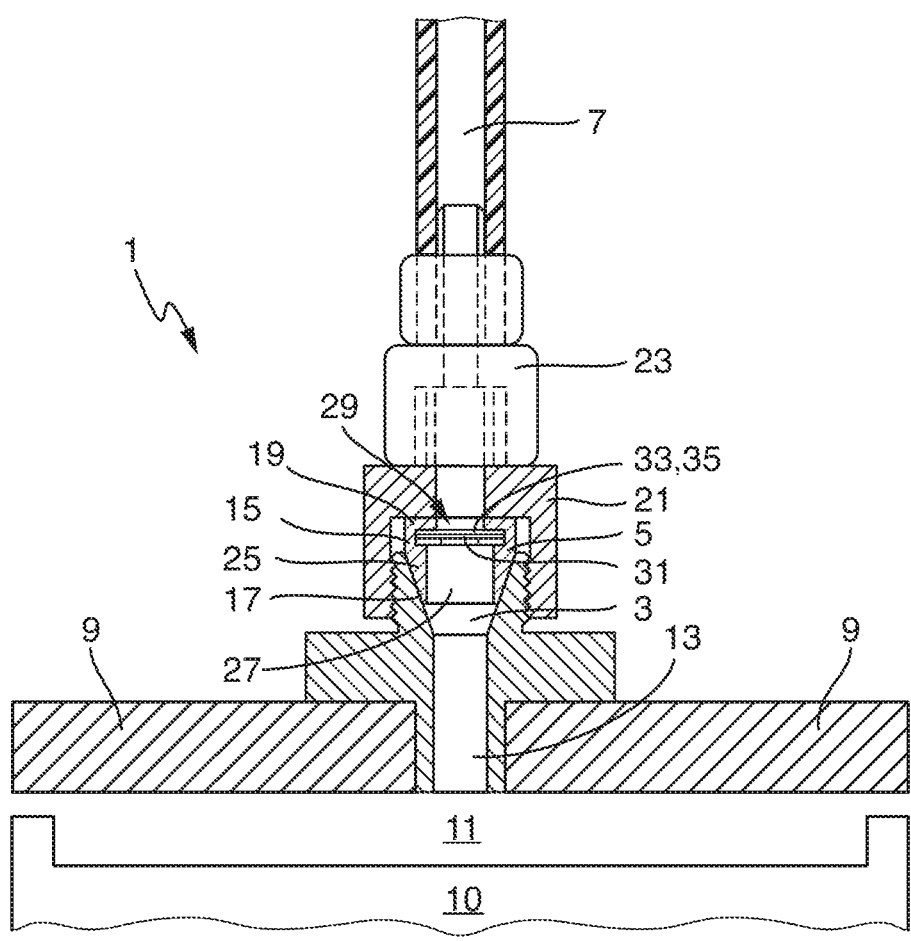
FIG. 1 shows a schematic representation of an exemplary embodiment of the infusion device according to the invention having a resin barrier device according to the invention, in accordance with a first exemplary embodiment.

FIG. 1 shows an exemplary embodiment of the infusion tool 1 according to the invention. The infusion tool 1 has a venting outlet 3 and a ventilation line 7 connected to the venting outlet 3 via a resin barrier device 5. A vacuum device (not shown) is preferably connected to the ventilation line 7. The infusion tool 1 also has a first tool part 9 and a second tool part 10, which enclose a cavity 11, which corresponds to the shape of a component (not shown) to be produced. The venting outlet 3 is provided in the first tool part 9 and is connected to the cavity 11 via a venting channel 13.

The resin barrier device 5 has a tubular intermediate piece 15 having a first end 17 and an opposing second end 19. The first end 17 is connected to the venting outlet 3 and the second end 19 is connected to the ventilation line 7 via an adapter piece 21. The adapter piece 21 in this case is compatible with the standard connection 23 of the ventilation line 7. The tubular intermediate piece 15 has a pipe wall 25 surrounding a channel 27, which forms a fluid connection between the first end 17 and the second end 19.

A semi-permeable barrier wall 29 is provided in the channel 27. The barrier wall 29 has a semi-permeable membrane 31 arranged to let an airflow pass from the first end 17 to the second end 19 and to block a resin flow from the first end 17 to the second end 19. Furthermore, the barrier wall 29 has a permeable supporting structure 33, in the present exemplary embodiment a lattice 35 disposed on the side of the membrane 31 facing towards the second end, which supports the membrane 31.

In this way, when a negative pressure is produced by the vacuum device in the ventilation line 7, resin can be sucked through the cavity 11 and thus through a preform provided but not shown in the cavity 11, until the resin flows through the venting outlet 3 and reaches the resin barrier device 5 at the barrier 29. Due to the semi-permeable membrane 31, the air sucked in ahead of the resin can easily penetrate the barrier wall 29 of the resin barrier device 5, while the resin is stopped by the barrier wall 29, thus preventing the ventilation line 7 from being contaminated and simultaneously preventing air inclusions resulting from air remaining in the cavity 11.

FIGS. 2 to 4 show a further exemplary embodiment of the resin barrier device 5 according to the invention, which differs from the embodiment of the resin barrier device 5 shown in FIG. 1, primarily in that it is implemented in a two-piece design. Because of the high degree of similarity to the first exemplary embodiment of the resin barrier device 5, the same reference numerals are used for corresponding features.

The resin barrier device 5 has a tubular intermediate piece 15 and a semi-permeable barrier wall 29. The tubular intermediate piece 15 has a first end 17 and an opposite second end 19. The first end 17 is adapted for connection to a venting outlet 3 of an infusion tool 1. The second end 19 is adapted for connection to a ventilation line 7. The tubular intermediate piece 15 also has a channel 27 surrounded by a wall 25, forming a fluid connection between the first and the second end 17,19. The barrier wall 29 is provided in the channel 27 and has a semi-permeable membrane 31 as well as a support structure 33. The semi-permeable membrane 31 is arranged to let an airflow pass from the first end 17 to the second end 19 and to block a resin flow from the first end 17 to the second end 19. The support structure 33 is formed as a lattice 35, which is disposed on the side of the membrane 31 facing the second end 19 and supports the membrane 31 against the pressure of the resin.

The tubular intermediate piece 15 has a first pipe part 37 and a second pipe part 39, the first pipe part 37 having the first end 17 and the second pipe part 39 having the second end 19. The first and second pipe parts 37, 39 are connected to each other in a detachable manner. The first pipe part 37 has a first flange section 41 opposite the first end 17, and the second pipe part 39 has a second flange section 43 opposite the second end 19, the first flange section 41 being connected to the second flange section 43 in a detachable manner. The barrier wall 29 is fixed between the first flange section 41 and second flange sections 43, a gap 45 being provided between the first and second flange sections 41, 43, in which the barrier wall 29 is disposed and clamped between the first and second flange sections 41, 43. A sealing ring 47 is also provided between the barrier wall 29 and the second flange section 43. The first flange section 41 and the second flange section 43 are connected via a snap connection, the second flange section 43 having a snap arm 49, which engages with the first flange section 41 and thus holds it to the second flange section 43.

Further, the first pipe part 37 has, opposite the first flange section 41, a first port section 51, which is provided to be inserted into the venting outlet 3. The outer surface 53 of the first port section 51 in this case is conical and has barbs 55 in order to achieve a good anchoring in the venting outlet 3. Simultaneously, the second pipe part 39 has, opposite the second flange part 43, a second port section 57, which is provided to be introduced into the ventilation line 7. The outer surface 59 of the second port section 57 in this case is designed conical and has barbs 55 in order to achieve a secure anchoring in the ventilation line 7.

Such a two-piece design of the resin barrier device 5 can be used to easily remove and replace the barrier wall 29, or even the membrane 31, if they are soiled by resin, after the connection between the first and second flange sections 41, 43 has been loosened. Thus, of the entire resin barrier device 5, only the barrier wall 29 itself, possibly even only the membrane 31, is designed as a wear part, which has to be replaced after every infusion procedure. All remaining parts of the resin barrier device 5 can be used permanently, achieving a particularly economical and environmentally friendly process.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A resin barrier device for an infusion tool, comprising
a tubular intermediate piece having a first end that is adapted for connection to a venting outlet of an infusion tool, having an opposite second end adapted to be connected to a ventilation line, and having a channel surrounded by a pipe wall, the channel forming a fluid connection between the first end and the second end, and
a semi-permeable barrier wall assembly provided in the channel and configured to let an airflow pass from the first end towards the second end and to block a resin flow from the first end towards the second end,
wherein the semi permeable barrier wall assembly includes a semi-permeable membrane configured to pass air flowing from the first end towards the second end and block resin flowing from the first end towards the second end, and
the semi permeable barrier assembly includes a support structure supporting the semi-permeable membrane.

2. The resin barrier device according to claim 1, wherein the support structure in the barrier wall assembly opposing flanges between which are mounted the semi permeable membrane.

3. The resin barrier device according to claim 2, wherein the opposing flanges are opposing annular discs.

4. The resin barrier device according to claim 3, wherein the support structure is formed as a lattice, which is disposed on the side of the membrane facing the second end.

5. The resin barrier device according to claim 1, wherein the tubular intermediate piece comprises a first pipe part and a second pipe part,
wherein the first pipe part has the first end and the second pipe part has the second end and
wherein the first and second pipe parts are connected to each other in a detachable manner.

6. The resin barrier device according to claim 5, wherein the first pipe part comprises a first flange section opposite the first end,
wherein the second pipe part comprises a second flange section opposite the second end,
wherein the first flange section is connected to the second flange section in a detachable manner, and
wherein the barrier wall is fixed between the first flange section and the second flange section.

7. The resin barrier device according to claim 6, wherein a gap is provided between the first and second flange sections, and wherein the barrier wall is disposed in the gap.

8. The resin barrier device according to claim 6, wherein the barrier wall is clamped between the first and second flange sections.

9. The resin barrier device according to claim 6, wherein a sealing ring is provided between the barrier wall and the first flange section or the second flange section.

10. The resin barrier device according to claim 6, wherein the first flange section and the second flange section are connected via a snap connection,
wherein one of the first and second flange sections has a snap arm which engages with the other of the first and second flange sections.

11. The resin barrier device according to claim 6, wherein the first pipe part opposite the first flange section has a first port section which is provided to be inserted into the venting outlet and the outer surface of which is conically formed and has barbs, or
wherein the second pipe part opposite the second flange section has a second port section which is provided to be inserted into the ventilation line and the outer surface of which is conically formed and has barbs.

12. An infusion tool including:
a venting outlet;
a ventilation line; and
a resin barrier device including:
a first end connected to the venting outlet,
a second end connected to the ventilation line;
a channel surrounded by a pipe wall forming a fluid passage between the first end and the second end, and
a semi-permeable barrier membrane spanning the channel and configured to pass air flowing from the first end to the second end and block resin flowing from the first end.

13. The infusion tool according to claim 12, wherein, via an adapter piece, the first end is connected to the venting outlet or the second end is connected to the ventilation line.

14. The infusion tool according to claim 12, wherein the infusion tool comprises a first tool part and a second tool part,
wherein the first tool part and the second tool part enclose a cavity which corresponds to the shape of a component to be produced, and
wherein the venting outlet is provided in the first tool part or in the second tool part and is connected to the cavity via a venting channel.

15. The infusion tool according to claim 12, wherein the infusion tool comprises a first tool part having a shaping surface corresponding to a shape of a component to be produced, and wherein the venting outlet is provided in the first tool part and is connected to the shaping surface via a venting channel.

16. An assembly comprising:
an infusion tool having an inner surface facing a cavity configured to receive a fiber composite material, an outer surface and a venting outlet extending from the inner surface to the outer surface;
an intermediate piece external to the infusion tool and having an interior channel, wherein a first end of the intermediate piece is configured to connect to the venting outlet so that the interior channel has a first end open to the venting outlet, and a second end of the intermediate piece is configured to connect to a ventilation line so that a second end of the interior channel is open to the ventilation line, and a semi-permeable barrier wall in the interior channel and configured to pass air flowing from the venting outlet to the ventilation line and to block resin flowing from the venting outlet.

17. The assembly of claim 16 wherein the a semi-permeable barrier wall includes a semi-permeable membrane and a permeable support structure supporting the membrane.

18. The assembly according to claim 17, wherein the tubular intermediate piece comprises a first pipe part and a second pipe part, wherein the first pipe part has the first end and the second pipe part has the second end;

the first and second pipe parts are connected to each other in a detachable manner, and the semi-permeable barrier wall is between the first and second pipe parts while connected.

19. The resin barrier device according to claim 1, wherein the first end comprises a fitting that is adapted to connect to the venting outlet of the infusion tool.

20. The assembly of claim 16, wherein the first end of the intermediate piece includes a fitting connected to the venting outlet.

* * * * *